United States Patent
Kishi et al.

(10) Patent No.: US 7,419,744 B2
(45) Date of Patent: Sep. 2, 2008

(54) NONAQUEOUS ELECTROLYTE SECONDARY BATTERY AND BATTERY PACK

(75) Inventors: Takashi Kishi, Yokosuka (JP); Hidesato Saruwatari, Kawasaki (JP); Takashi Kuboki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 65 days.

(21) Appl. No.: 11/492,106

(22) Filed: Jul. 25, 2006

(65) Prior Publication Data

US 2007/0026318 A1 Feb. 1, 2007

(30) Foreign Application Priority Data

Jul. 26, 2005 (JP) ............... 2005-216177

(51) Int. Cl.
*H01M 4/58* (2006.01)
(52) U.S. Cl. .............. 429/218.1; 429/231.5; 429/231.1; 429/231.3; 429/323; 429/200; 429/203; 429/231.95
(58) Field of Classification Search .............. 429/231.5, 429/231.1, 231.3, 218.1, 323, 231.95, 203, 429/200
See application file for complete search history.

(56) References Cited

U.S. PATENT DOCUMENTS

| 6,203,942 | B1 * | 3/2001 | Gan et al. .................... 429/203 |
| 6,511,772 | B2 | 1/2003 | Gan et al. |
| 7,029,793 | B2 * | 4/2006 | Nakagawa et al. ....... 429/231.1 |
| 2005/0164082 | A1 | 7/2005 | Kishi et al. |
| 2006/0068282 | A1 | 3/2006 | Kishi et al. |

FOREIGN PATENT DOCUMENTS

| JP | 4-349365 | 12/1992 |
| JP | 10-255839 | 9/1998 |
| JP | 11-86905 | 3/1999 |
| JP | 2001-160415 | 6/2001 |
| JP | 2001-319688 | 11/2001 |
| JP | 2002-110225 | 4/2002 |
| JP | 2002-203598 | 7/2002 |
| WO | WO 01/86748 A1 | 11/2001 |

OTHER PUBLICATIONS

U.S. Appl. No. 11/683,605, filed Mar. 8, 2007, Kishi, et al.
U.S. Appl. No. 11/276,843, filed Mar. 16, 2006, Takashi Kuboki, et al.

* cited by examiner

*Primary Examiner*—Laura S Weiner
(74) *Attorney, Agent, or Firm*—Oblon, Spivak, McClelland, Maier & Neustadt, P.C.

(57) ABSTRACT

A nonaqueous electrolyte secondary battery includes a positive electrode, a negative electrode, and a nonaqueous electrolyte. The negative electrode contains an active material providing a working potential which is nobler by at least 0.5V than a lithium metal potential. Also, the nonaqueous electrolyte contains an ionic liquid and allyl phosphate represented by chemical formula given below:

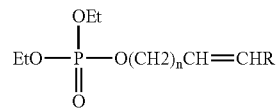

where R denotes hydrogen atom or an alkyl group having 1 to 3 carbon atoms, and n denotes an integer of 1 to 3.

17 Claims, 6 Drawing Sheets

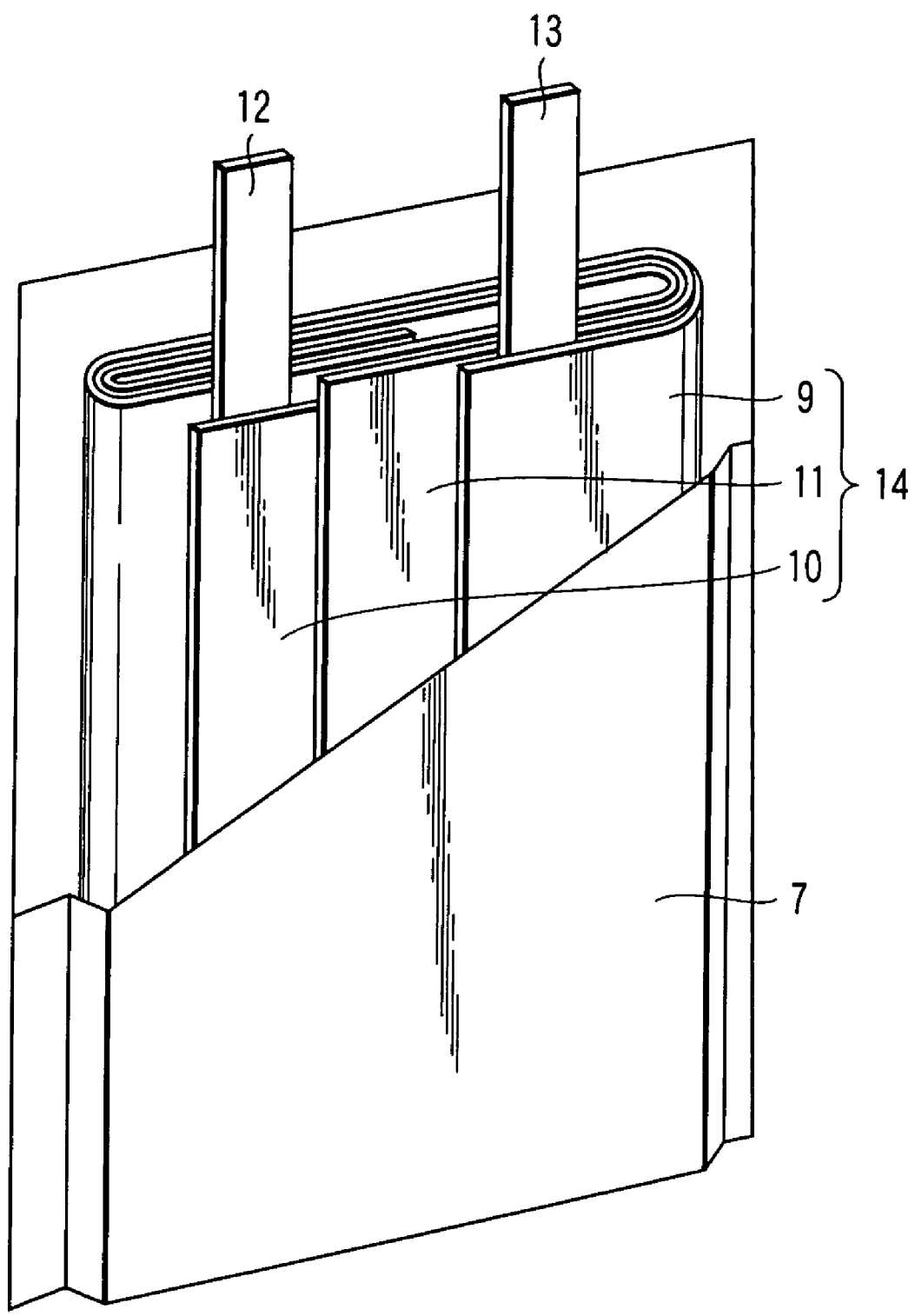
F I G. 4

NONAQUEOUS ELECTROLYTE SECONDARY BATTERY AND BATTERY PACK

CROSS-REFERENCE TO RELATED APPLICATIONS

This application is based upon and claims the benefit of priority from prior Japanese Patent Application No. 2005-216177, filed Jul. 26, 2005, the entire contents of which are incorporated herein by reference.

BACKGROUND OF THE INVENTION

1. Field of the Invention

The present invention relates to a secondary battery comprising a nonaqueous electrolyte and to a battery pack comprising the secondary battery.

2. Description of the Related Art

In recent years, the market of portable information apparatuses such as a portable telephone and a small personal computer is being rapidly expanded. With progress in the miniaturization and in the weight reduction of these portable information apparatuses, the power source of the apparatus is also required to be miniaturized and to be made lighter in weight. A lithium ion secondary battery having a high energy density is used in many of these portable information apparatuses, and a research on the lithium ion secondary battery is being conducted even nowadays. In recent years, the miniaturization is being promoted in various apparatuses such as the digital audio apparatus and the POS terminal in accordance with progress of the technology. When the apparatus is made portable by miniatuarization, a battery that permits eliminating the power source cord is required in place of the conventional AC power source. Under these circumstances, the field of use of the secondary battery is being expanded. It should also be noted that the improvement of the battery performance is always required in the information apparatus such as a personal computer and the portable telephone in which the secondary battery continued to be used in the past. A lead-acid battery, a nickel-cadmium secondary battery, a nickel-hydrogen secondary battery, etc. were used in the past as the secondary battery. However, these conventional secondary batteries were not satisfactory in respect of the requirements for the miniaturization and the weight reduction. On the other hand, a nonaqueous electrolyte secondary battery is small in size, low in weight and has a large capacity. Therefore, the nonaqueous electrolyte secondary battery has come to be used in the personal computer and the portable telephone noted above as well as in a digital camera, a video camera, etc.

The nonaqueous electrolyte secondary battery noted above includes a secondary battery comprising a positive electrode active material, a negative electrode active material, and an electrolyte. A lithium-containing cobalt composite oxide or a lithium-containing nickel composite oxide is used as the positive electrode active material. Also, a graphite series or a coke series carbon material is used as the negative electrode active material. Further, an organic solvent having a lithium salt such as $LiPF_6$ or $LiBF_4$ dissolved therein is used as the electrolysis solution. Each of the positive electrode and the negative electrode is used as sheets. The positive and negative electrodes are electronically insulated from each other because a separator holding the electrolyte is arranged between the positive electrode and the negative electrode. Further, the positive electrode, the negative electrode and the separator are housed in a container having any of various shapes to form a battery.

The electrolysis solution used in the nonaqueous electrolyte secondary battery described above contains a flammable organic solvent as a main component. Therefore, a chemical reaction that is not supposed to take place in the ordinary charge-discharge operation may occur, due to, for example, over-charging, which makes the secondary battery thermally unstable. In such a case, it is possible that the safety of the battery to be impaired by the combustion of the organic solvent.

It was studied in the past to change the composition of the electrolyte solution for overcoming the problem noted above. In the electrolyte solution based on the organic solvent, ethylene carbonate, diethyl carbonate, ethyl methyl carbonate or γ-butyrolactone etc. was used as the solvent. These solvents have a flash point of 152° C., 31° C., 24° C. and 98° C., respectively. It was attempted to improve the safety of the battery by using ethylene carbonate or γ-butyrolactone as the solvent, which have a relatively high flash point among the solvents noted above. However, an example is reported that the temperature within a vehicle exceeded 100° C. in summer, which indicates that the use of ethylene carbonate and/or γ-butyrolactone is not sufficient for improving the safety of the battery.

It is also attempted to improve the safety of the battery by adding a flame-retardant phosphoric ester to the organic solvent-based electrolyte solution. Trimethyl phosphate (TMP) is added in a large amount to the electrolyte solution to improve the safety but it causes the deterioration of the performance of the secondary battery. For example, it is described in JP-A No. 2001-160415 (KOKAI) that an allyl series phosphoric ester such as dimethyl allyl phosphate is added to the electrolyte solution in order to suppress the performance detrioration by large amount TMP addition. As a matter of fact, the patent document quoted above refers to an Example in which dimethyl allyl phosphate, TMP and a graphite series negative electrode active material are used together. On the other hand, it is described in JP-A No. 2002-203598 (KOKAI) that a lactone series organic solvent such as γ-butyrolactone brings about a reaction with a graphite series negative electrode active material and that, in order to suppress the particular reaction, an additive is added to the electrolysis solution. The additive noted above includes an allyl series phosphoric ester such as dimethyl allyl phosphate. It should be noted that, in each of the examples quoted above, dimethyl allyl phosphate is used as the allyl series phosphoric ester in order to suppress the reaction between the organic solvent such as TMP or a lactone series organic solvent and the negative electrode active material.

However, the nonaqueous electrolysis solution used in the lithium secondary battery described in each of JP-A No. 2001-160415 (KOKAI) and JP-A No. 2002-203598 (KOKAI) referred to above contains an organic solvent as an indispensable component and, thus, the electrolysis solution inevitably has the flash point. Such being the situation, it was impossible for the lithium secondary battery to secure a sufficient safety under the conditions involving various dangers such as the internal short-circuiting, the external short-circuiting, the flame spread from the outside and the compressive breakage of the battery.

As another attempt, there is a research in which an ionic liquid that assumes a liquid state under room temperature and doe not have the flash point is used to improve the safety of the battery. For example, a nonaqueous electrolyte secondary battery with the ionic liquid as the electrolyte is disclosed in JP-A No. 4-349365 (KOKAI) as a secondary battery with excellent safety. In the secondary battery disclosed in this patent document, a lithium metal oxide is used as the positive electrode active material. Also, a lithium metal, a lithium alloy or a carbonaceous material capable of intercalating or deintercalating lithium ions is used as the negative electrode active material. Further, an ionic liquid containing a lithium salt, aluminum halide, and a halogenated quaternary ammonium is used as the electrolyte.

Further, JP-A No. 11-86905 (KOKAI) discloses a nonaqueous electrolyte secondary battery having a composition explained below as a secondary battery excellent in safety and enhanced in the charge-discharge cycle life and in the discharge capacity. This nonaqueous electrolyte secondary battery comprises a positive electrode, a negative electrode containing a carbonaceous material intercalating or deintercalating lithium ions, and an ionic liquid used as an electrolyte and formed of quaternary ammonium ion, lithium ion and fluoride anion containing an element selected from the boron, phosphorus and sulfur.

However, the ionic liquid noted above reacts with the positive electrode or the negative electrode. As a result, the charge-discharge cycle life of the secondary battery is shortened.

BRIEF SUMMARY OF THE INVENTION

According to one aspect of the present invention, there is provided a nonaqueous electrolyte secondary battery comprising:

a negative electrode containing an active material providing a working potential which is nobler than a lithium metal potential by at least 0.5V;

a positive electrode; and a nonaqueous electrolyte containing an ionic liquid and allyl phosphate represented by chemical formula given below:

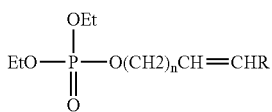

where R denotes hydrogen atom or an alkyl group having 1 to 3 carbon atoms, and n denotes an integer of 1 to 3.

According to another aspect of the present invention, there is provided a battery pack comprising a nonaqueous electrolyte secondary battery, wherein the nonaqueous electrolyte secondary battery comprises:

a negative electrode containing an active material providing a working potential which is nobler than a lithium metal potential by at least 0.5V;

a positive electrode; and a nonaqueous electrolyte containing an ionic liquid and allyl phosphate represented by chemical formula given below:

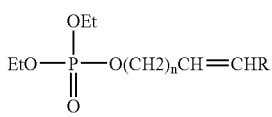

where R denotes hydrogen atom or an alkyl group having 1 to 3 carbon atoms, and n denotes an integer of 1 to 3 comprising:

BRIEF DESCRIPTION OF THE SEVERAL VIEWS OF THE DRAWING

FIG. 4 is an oblique view, partly broken away, schematically showing another flattened type nonaqueous electrolyte secondary battery according to the first embodiment;

DETAILED DESCRIPTION OF THE INVENTION

Figure 1:
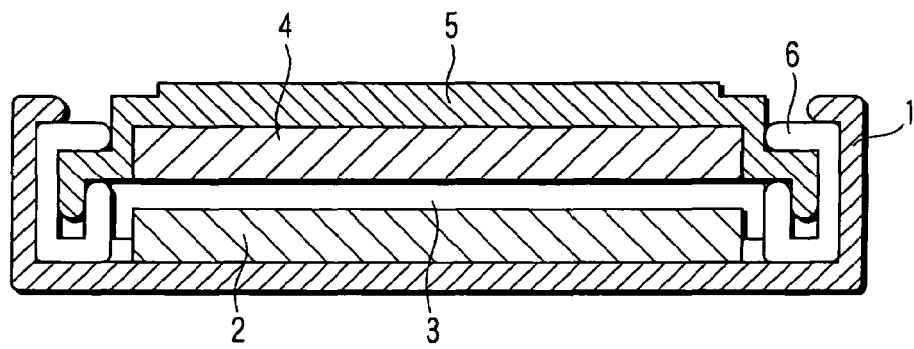
FIG. 1 is a cross-sectional view schematically showing a coin type nonaqueous electrolyte secondary battery according to a first embodiment.

As a result of an extensive research that was conducted in an attempt to improve the charge-discharge cycle performance of the nonaqueous electrolyte secondary battery comprising a nonaqueous electrolyte containing an ionic liquid, the present inventors have found that it is possible to suppress the reaction of the positive electrode and the negative electrode with the ionic liquid by using a negative electrode containing an active material exhibiting a working potential nobler by at least 0.5V than a lithium metal potential (a lithium electrode potential) and by allowing the nonaqueous electrolyte to contain an allyl phosphate represented by chemical formula given above. Also, it is considered reasonable to understand that a stable protective layer can be formed by allyl phosphate to perform a reaction on the positive electrode in the charging stage, though the detailed mechanism of the particular reaction has not yet been clarified.

It should also be noted that the nonflammability and the flame retardancy of the nonaqueous electrolyte can be enhanced to make it possible to improve drastically the thermal safety of the battery. Further, the surfactant effect produced by the allyl phosphate permits improving the impregnability of the nonaqueous electrolyte without impairing the flame retardancy of the nonaqueous electrolyte.

Sufficient charge-discharge cycle performance of the secondary battery can be obtained by allowing the nonaqueous electrolyte to contain 0.1 to 3% by weight of the allyl phosphate.

Also, the reaction between the positive electrode and the ionic liquid can be further suppressed by using an ionic liquid having a cation having an imidazolium skeleton to make it possible to further improve the charge-discharge cycle performance of the secondary battery. Alternatively, the reaction between the positive electrode and the ionic liquid can be further suppressed by allowing the positive electrode to contain a lithium composite oxide containing at least one kind of the metal element selected from the group consisting of cobalt, manganese and nickel to make it possible to further improve the charge-discharge cycle performance of the secondary battery.

First Embodiment

Each embodiment of the present invention will now be described with reference to the accompanying drawing. In the following description, the common constituent of the embodiment is denoted by the same reference numeral to omit the overlapping description. Also, each drawing is no more than a schematic drawing that is intended to facilitate the description and the understanding of the present invention. In other words, it is possible for the accompanying drawing to differ from the actual apparatus in the shape, size, ratio, etc. However, the design of the secondary battery can be changed appropriately in view of the description given below and the known technology.

As shown in FIG. 1, a pellet-like positive electrode 2 is housed in a positive electrode container 1 formed of a metal and also acting as a positive electrode terminal. A separator 3 is stacked on the positive electrode 2. Further, a pellet-like negative electrode 4 is stacked on the separator 3. It should be noted that each of the positive electrode 2, the separator 3 and the negative electrode 4 is impregnated with a nonaqueous electrolyte. A negative electrode container 5, which also acts as a negative electrode terminal, is crimped and fixed to the positive electrode container 1 with an insulating gasket 6 between the positive electrode container 1 and the negative electrode container 5. The inner surface of the negative electrode container 5 is in contact with the negative electrode 4. Each of the positive electrode container 1 and the negative electrode container 5 is formed of, for example, stainless steel or iron. Also, it is possible to use, for example, polypropylene, polyethylene, vinyl chloride, polycarbonate or Teflon for forming the insulating gasket 6.

The positive electrode, the negative electrode, the separator and the nonaqueous electrolyte will now be described in detail.

1) Positive Electrode

The positive electrode contains a positive electrode active material. It is also possible for the positive electrode to contain a material having an electronic conductivity such as carbon, which is herein after referred to as a conductive material, and to contain a binder for forming the positive electrode in the shape of a sheet or a pellet. It is also possible to use a base material having an electronic conductivity such as a metal as a current collector and to use the positive electrode that is in contact with the current collector.

The positive electrode active material includes, for example, a metal oxide capable of intercalating or deintercalating lithium ions and a chalcogen compound such as titanium disulfide or molybdenum disulfide. The metal oxide noted above includes, for example, a lithium-containing cobalt composite oxide, a lithium-containing nickel-cobalt composite oxide, a lithium-containing nickel composite oxide, a lithium-manganese composite oxide, and a lithium-containing vanadium oxide. In particular, it is desirable to use as the positive electrode active material a lithium composite oxide containing at least one kind of the metal element selected from the group consisting of cobalt, manganese and nickel. Particularly, it should be noted that the lithium-containing cobalt composite oxide, the lithium-containing nickel-cobalt composite oxide and the lithium-containing manganese composite oxide exhibit at least 2.5V of the charge-discharge potential relative to the lithium metal potential to make it possible to realize a high battery capacity. It should also be noted that the lithium composite oxide containing at least one kind of the metal element selected from the group consisting of cobalt, manganese and nickel makes it possible to suppress the decomposing reaction of the ionic liquid on the surface of the positive electrode under temperatures not lower than room temperature. The particular lithium composite oxide can be represented by the formula $LiCo_xNi_yMn_zO_2$ ($x+y+z=1$, $0<x\leq0.5$, $0\leq y<1$, $0\leq z<1$).

The binder includes, for example, polytetrafluoro ethylene (PTFE), polyvinylidene fluoride (PVdF), ethylene-propylene-diene copolymer, and styrene-butadiene rubber.

It is possible for the positive electrode to contain as the current collector a foil, a thin plate or a mesh of a metal. The material used for forming the current collector includes, for example, aluminum, stainless steel and titanium.

The positive electrode can be prepared by adding the conductive material and the binder to the positive electrode active material, followed by kneading the mixture and subsequently rolling the kneaded mass to pelletize the rolled mass or to form the kneaded mass into a sheet. Alternatively, the positive electrode can be prepared by preparing first a slurry in which a mixture of the positive electrode active material, the conductive material and the binder is dissolved or suspended in a solvent such as toluene or N-methyl pyrrolidone (NMP), followed by coating the current collector with the slurry and subsequently drying and forming into a sheet the current collector coated with the slurry.

2) Negative Electrode

The negative electrode contains a negative electrode active material. The negative electrode can be obtained by molding a mixture containing, for example, the negative electrode active material, a conductive material and a binder into a pellet, a thin plate or a sheet.

The negative electrode active material is formed of an active material exhibiting at least 0.5V of the negative electrode working potential relative to the lithium metal potential (lithium electrode potential), i.e., the negative electrode working potential nobler than the lithium metal potential by at least 0.5V. It should be noted that, in the case of using the negative electrode active material exhibiting the negative electrode working potential lower than 0.5V relative to the lithium metal potential, a reaction is carried out between the negative electrode active material and the ionic liquid to decompose the ionic liquid, resulting in failure to improve the charge-discharge cycle performance of the secondary battery. Where the negative electrode working potential is set to fall within a range of 0.5V to 3V relative to the lithium metal potential, it is possible to suppress the decomposing reaction of the ionic liquid and, thus, a high battery voltage can be obtained. It is more desirable for the negative electrode working potential to fall within a range of 0.5V to 2V.

It is desirable for the negative electrode active material exhibiting at least 0.5V of the negative electrode working potential relative to the lithium metal potential to be selected from the group consisting of a metal oxide, a metal sulfide, a metal nitride and an alloy.

The metal oxide includes, for example, a titanium-containing metal composite oxide, an amorphous tin oxide such as $SnB_{0.4}P_{0.6}O_{3.1}$, a tin silicon oxide such as $SnSiO_3$, silicon oxide such as $SiO$, and tungsten oxide such as $WO_3$. Particularly, it is desirable to use titanium-containing metal composite oxide as the negative electrode active material.

The titanium-containing metal composite oxide noted above includes, for example, lithium-titanium oxide and a titanium-based oxide that does not contain lithium in the synthesizing stage of the oxide. The lithium-titanium oxide noted above includes, for example, lithium titanate having a spinel structure and lithium titanate having a ramsdellite structure. The lithium titanate having the spinel structure can be represented by the chemical formula $Li_{4+x}Ti_5O_{12}$ ($-1 \leq x \leq 3$). The lithium titanate having the ramsdellite structure can be represented by the chemical formula $Li_{2+x}Ti_3O_7$ ($-1 \leq x \leq 3$). The titanium-based oxide noted above includes, for example, $TiO_2$ and a metal composite oxide containing Ti and at least one element selected from the group consisting of P, V, Sn, Cu, Ni and Fe. It is desirable for $TiO_2$ to be of anatase type and to have a low crystallinity caused by a heat treating temperature of 300 to 500° C. The metal composite oxide containing Ti and at least one element selected from the group consisting of P, V, Sn, Cu, Ni and Fe includes, for example, $TiO_2$—$P_2O_5$, $TiO_2$—$V_2O_5$, $TiO_2$—$P_2O_5$—$SnO_2$, and $TiO_2$—$P_2O_5$—MeO (Me denoting at least one element selected from the group consisting of Cu, Ni and Fe). To be more specific, it is desirable for the micro structure of the metal composite oxide to include a crystal phase and an amorphous phase or to include a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni and Fe.

The metal sulfides include, for example, titanium sulfide such as $TiS_2$, molybdenum sulfide such as $MOS_2$, and iron sulfides such as FeS, $FeS_2$, and $Li_xFeS_2$.

The metal nitride includes, for example, lithium-cobalt nitride such as $Li_xCo_yN$ ($0<x<4$, $0<y<0.5$).

It is most desirable to use a lithium-titanium oxide and iron sulfide as the negative electrode active material in view of the effect of suppressing the deterioration of the ionic liquid caused by the side reaction carried out on the surface of the negative electrode active material.

Incidentally, it is possible to use a mixture of two or more negative electrode active materials. Concerning the shape of the negative electrode active material, it is possible for the negative electrode active material to have various shapes, e.g., to be scale-like, fibrous or spherical.

A material having an electronic conductivity such as carbon or a metal can be used in the negative electrode as the conductive material. It is desirable for the conductive material to be powdery or fibrous.

The binder includes, for example, polytetrafluoro ethylene (PTFE), polyvinylidene fluoride (PVdF), styrene-butadiene rubber and carboxymethyl cellulose (CMC). Further, the current collector includes, for example, a foil, a thin plate or a mesh formed of a metal such as copper, stainless steel or nickel.

The negative electrode can be prepared by adding the conductive material and the binder to the negative electrode active material, followed by kneading the mixture and subsequently rolling the kneaded mass to pelletize the rolled mass or to form the rolled mass into a sheet. Alternatively, the negative electrode can be prepared by preparing first a slurry in which a mixture of the negative electrode active material, the conductive material and the binder is dissolved or suspended in a solvent such as water or N-methyl pyrrolidone (NMP), followed by coating the current collector with the slurry and subsequently drying and forming into a sheet the current collector coated with the slurry.

3) Nonaqueous Electrolyte

The nonaqueous electrolyte contains the ionic liquid and allyl phosphate described herein later.

The ionic liquid denotes a salt exhibiting a liquid form at least partially at room temperature and includes a mixed salt containing a salt that does not exhibit a liquid form at room temperature such as lithium tetrafluoroborate. The mixed salt noted above exhibits as a whole a liquid form at room temperature.

The organic cation forming the ionic liquid, which is not particularly limited in the present invention, includes, for example, an unsaturated quaternary ammonium ion and a saturated quaternary ammonium ion. It is possible for a single kind of or a mixture of different kinds of cations to be contained in the ionic liquid.

The compounds providing the unsaturated quaternary ammonium ion include, for example, 1-ethyl-3-methyl imidazolium, 1-methyl-3-propyl imidazolium, 1-methyl-3-isopropyl imidazolium, 1-butyl-3-methyl imidazolium, 1-ethyl-2,3-dimethyl imidazolium, 1-ethyl-3,4-dimethyl imidazolium, N-propyl pyridinium, N-butyl pyridinium, N-tert-butyl pyridinium, N-tert-pentyl pyridinium, N-methyl-N-propyl pyrrolidinium ion, N-butyl-N-methyl pyrrolidinium ion, N-methyl-N-pentyl pyrrolidinium, N-propoxy ethyl-N-methyl pyrrolidinium, N-methyl-N-propyl piperidinium, N-methyl-N-isopropyl piperidinium, N-butyl-N-methyl piperidinium, N-isobutyl-N-methyl piperidinium, N-sec-butyl-N-methyl piperidinium, N-methoxy ethyl-N-methyl piperidinium, and N-ethoxy ethyl-N-methyl piperidinium.

On the other hand, the compounds providing the saturated quaternary ammonium ion include, for example, N-butyl-N,N,N-trimethyl ammonium, N-ethyl-N,N-dimethyl-N-propyl ammonium, N-butyl-N-ethyl-N,N-dimethyl ammonium, and N-butyl-N,N-dimethyl-N-propyl ammonium.

Among the unsaturated quaternary ammonium ions exemplified above, it is desirable to use a nitrogen-containing five-ring pyrrolidinium ion and a nitrogen-containing six-ring piperidinium ion. Each of the nitrogen-containing five-ring pyrrolidinium ion and the nitrogen-containing six-ring piperidinium ion exhibits a high resistance to reduction to suppress the side reaction and, thus, permits improving the storage performance and the charge-discharge cycle performance of the nonaqueous electrolyte secondary battery.

Also, among the unsaturated quaternary ammonium ions exemplified above, it is more desirable to use a cation having an imidazolium structure. In the case of using a cation having an imidazolium structure, it is possible to obtain the ionic liquid having a low viscosity, and high battery output characteristics can be obtained. Also, the particular ionic liquid exhibits a high effect of suppressing the side reaction on the negative electrode and, thus, makes it possible to realize a nonaqueous electrolyte secondary battery excellent in the storage performance and the charge-discharge cycle performance.

The anion forming the ionic liquid, which is not particularly limited in the present invention, includes at least one kind of fluorine-containing anions selected from the group consisting of a tetrafluoroborate anion ($BF_4^-$), a hexafluorophosphate anion ($PF_6^-$), a hexafluoro methane sulfonate anion, a bis (trifluoromethane sulfonyl) amide anion (TFSI) and a dicyanamide anion (DCA).

In order to obtain a large battery capacity, it is desirable to allow the nonaqueous electrolyte to contain a lithium salt. It is possible to use at least one kind of the lithium salt selected from the group consisting of, for example, lithium tetrafluoroborate ($LiBF_4$), lithium hexafluorophosphate ($LiPF_6$), lithium hexafluoro methane sulfonate, lithium bis (trifluoro methane sulfonyl) amide (LiTFSI), lithium bis (pentafluoro ethane sulfonyl) amide (LiBETI) and lithium dicyanamide (LiDCA).

It is desirable for the lithium salt concentration in the nonaqueous electrolyte to be set at 0.1 to 2.5 mol/L. If the lithium salt concentration is lower than 0.1 mol/L, it is difficult to obtain a sufficient ionic conductivity and, thus, the discharge capacity of the secondary battery tends to be lowered. On the other hand, if the lithium salt concentration exceeds 2.5 mol/L, the viscosity of the ionic liquid is excessively increased, with the result that the impregnability of the ionic liquid in the positive and negative electrodes tends to be lowered to lower the discharge capacity of the secondary battery. In order to suppress the salt precipitation and maintain a sufficient ionic conductivity under temperatures not higher than 0° C., it is more desirable for the lithium salt concentration in the nonaqueous electrolyte to be set at 0.5 to 1.8 mol/L.

The allyl phosphate is represented by chemical formula given below:

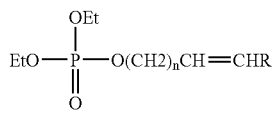

where R denotes hydrogen atom or an alkyl group having 1 to 3 carbon atoms, and n denotes an integer of 1 to 3. If the number of carbon atoms contained in the alkyl group R and the integer n exceed 3, the flame retardancy of the allyl phosphate is lowered.

In order to allow the allyl phosphate represented by chemical formula given above, e.g., diethyl allyl phosphate, to exhibit a high flame retardancy and to enable the secondary battery to exhibit higher charge-discharge cycle performance, it is desirable for R to represent a hydrogen atom and for the integer n to be 1.

Unlike the phosphoric ester that does not have an allyl group such as trimethyl phosphate, diethyl allyl phosphate performs a reaction with the positive and negative electrodes. In view of the situation that diethyl allyl phosphate suppresses the deterioration of, particularly, the positive electrode to improve the charge-discharge cycle performance of the secondary battery, though the detailed mechanism of suppressing the deterioration of the positive electrode has not yet been clarified, it is considered reasonable to understand that diethyl allyl phosphate reacts with the positive electrode to produce the effect of suppressing the reaction between the ionic liquid and the positive electrode active material. In order to prevent the initial capacity from being lowered by the increase in the irreversible capacity, it is desirable for the addition amount of the diethyl allyl phosphate to be not larger than 3% by weight. Also, if the addition amount noted above is smaller than 0.1% by weight, a sufficient improvement cannot be obtained in the charge-discharge cycle performance of the secondary battery. Also, in the case of using dimethyl allyl phosphate having methyl groups in place of the ethyl groups, the compound tends to be evaporated because the molecular weight of dimethyl allyl phosphate is smaller than that of diethyl allyl phosphate. Such being the situation, dimethyl allyl phosphate tends to be evaporated selectively even if the nonaqueous electrolyte is nonvolatile. It follows that a sufficient effect cannot be obtained by the addition of dimethyl allyl phosphate. Particularly, the charge-discharge cycle performance under high temperatures are not improved, and the battery inner pressure tends to be elevated. It may be reasonable to presume that the addition of dimethyl allyl phosphate causes the films, which are considered to be formed on the surfaces of the positive and negative electrodes, to differ from the films formed by diethyl allyl phosphate in the components to give rise to the difficulty noted above. It is more desirable for diethyl allyl phosphate to be added to the nonaqueous electrolyte in an amount of 0.5 to 2% by weight. If the addition amount of diethyl allyl phosphate falls within the range given above, it is possible to improve the charge-discharge cycle performance of the secondary battery while substantially preventing the output characteristics of the secondary battery from being lowered.

In order to obtain the flame retardancy as high as possible, it is desirable for the nonaqueous electrolyte not to contain organic solvents other than diethyl allyl phosphate. It should be noted, however, that it is possible for the nonaqueous electrolyte to contain the other organic solvents effective for suppressing the side reaction within the battery and effective for improving the affinity of the nonaqueous electrolyte with, for example, the separator. Also, it is desirable for the addition amount of the other organic solvents not to be larger than 10% by weight in order to maintain the flame retardancy of the nonaqueous electrolyte. Also, where the other organic solvents are added in order to control the chemical reaction such as a side reaction within the battery, it is desirable for the addition amount of the other organic solvents to be controlled such that at least half the addition amount of the other organic solvents is consumed after assembly of the secondary battery or after completion of the initial charge-discharge operation of the secondary battery. To be more specific, it is desirable for the addition amount of the other organic solvents to be not larger than 3% by weight. Alternatively, it is desirable for the other organic solvents to be added in a molar amount that is calculated from the current amount correspond to the irreversible capacity in the initial charge-discharge cycle, which is produced by the addition of the organic solvents.

4) Separator

The separator includes, for example, a porous film containing polyethylene, polypropylene, polyester, cellulose or polyvinylidene fluoride (PVdF) and an unwoven fabric made of a synthetic resin. Particularly, in view of the effect of improving the safety of the secondary battery, it is desirable for the separator to be formed of a porous film consisting of polyethylene or polypropylene because the particular porous film can be melted under a prescribed temperature to break the current. Also, in view of the output characteristics and the charge-discharge cycle performance of the secondary battery, it is desirable for the separator to be formed of an unwoven fabric of polyethylene terephthalate, which is a kind of polyester, because the particular unwoven fabric exhibits a high affinity with the nonaqueous electrolyte containing the ionic liquid.

The nonaqueous electrolyte secondary battery according to the first embodiment is not limited to the coin type secondary battery shown in FIG. 1. It is also possible for the nonaqueous electrolyte secondary battery to be cylindrical or prismatic, to be of a thin type or of a flattened type. Each of FIGS. 2 to 4 exemplifies the construction of the flattened nonaqueous electrolyte secondary battery according to the first embodiment.

Figure 2:
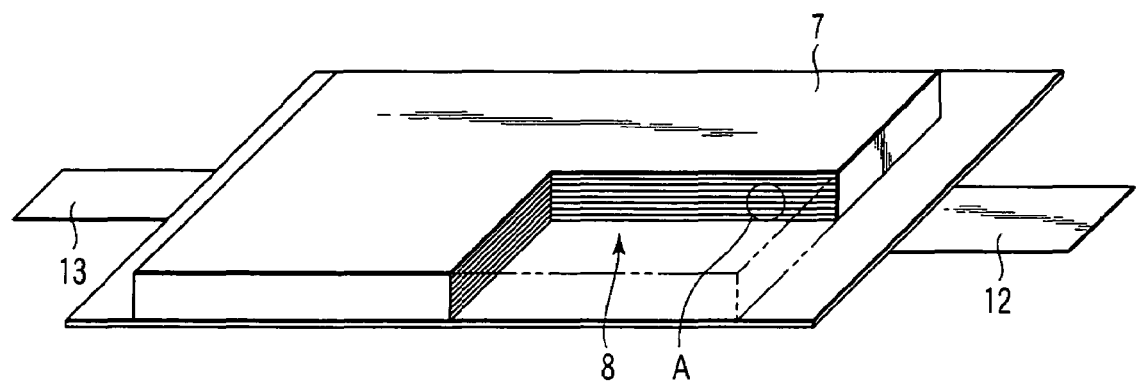
FIG. 2 is a partially cutaway schematic view showing a flattened nonaqueous electrolyte secondary battery according to the first embodiment.
Figure 3:
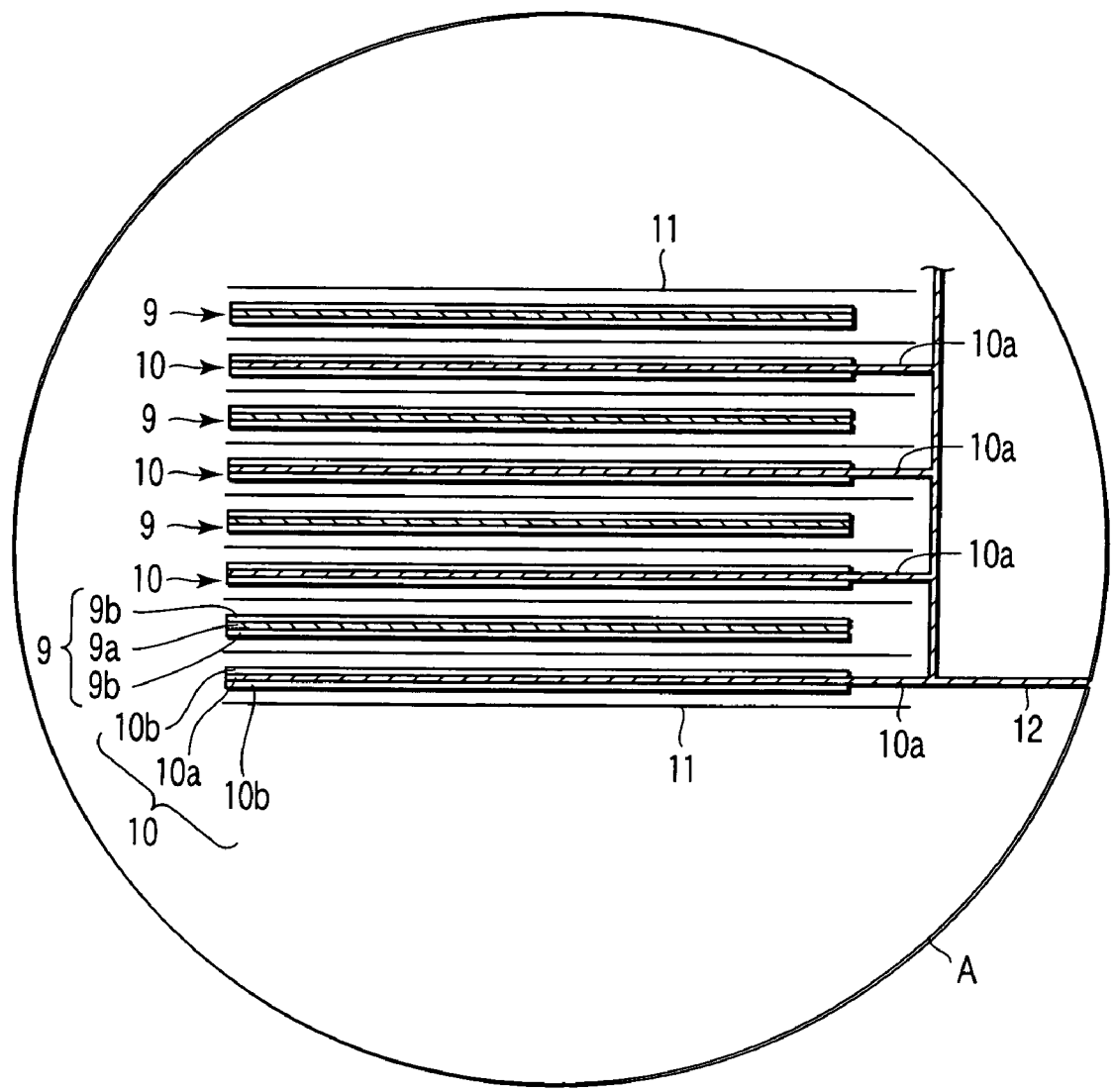
FIG. 3 is a cross-sectional view showing in a magnified fashion of part A shown in FIG. 2.

As shown in FIG. 2, a stack type electrode group 8 is housed in a case 7 formed of a laminate film. As shown in FIG. 3, the stack type electrode group 8 is constructed such that a positive electrode 9 and a negative electrode 10 are stacked one upon the other a plurality of times alternately with a separator 11 interposed between the positive electrode 9 and the negative electrode 10. The electrode group 8 includes a plurality of the positive electrodes 9 each comprising a positive electrode current collector 9a and positive electrode active material layers 9b supported on both surfaces of the positive electrode current collector 9a. The electrode group 8 also includes a plurality of the negative electrodes 10 each comprising a negative electrode current collector 10a and negative electrode active material layers 10b supported on both surfaces of the negative electrode current collector 10a. One side of the negative electrode current collector 10a included in the negative electrode 10 protrudes from the positive electrode 9. The negative electrode current collector 10a protruding from the positive electrode 9 is electrically connected to a band-like negative electrode terminal 12. The tip portion of the band-like negative electrode terminal 12 is drawn to the outside from the case 7. Also, that side of the positive electrode current collector 9a included in the positive electrode 9 which is positioned on the side opposite to the protruding side of the negative electrode current collector 10a, though the protruding side of the positive electrode current collector 9a is not shown in the drawing. The positive electrode current collector 9a protruding from the negative electrode 10 is electrically connected to a band-like positive electrode terminal 13. The tip portion of the band-like positive electrode terminal 13 is positioned on the side opposite to the side of the negative electrode terminal 12 and is drawn to the outside from a side of case 7. In the flattened nonaqueous electrolyte secondary battery shown in FIGS. 2 and 3, the positive electrode terminal 13 and the negative electrode terminal 12 are drawn to the outside from the mutually facing two sides of the case 7. However, it is also possible for the positive electrode terminal 13 and the negative electrode terminal 12 to be drawn to the outside from the same side of the case 7 as exemplified in FIG. 4.

As shown in the drawing, a spirally wound electrode group 14 has such a structure that a positive electrode 9, a negative electrode 10 and a separator 11 interposed between these are spirally rolled to form a flattened shape. More specifically, the electrode group 14 which has the above-described structure is prepared by spirally winding the positive and negative electrodes and the separator interposed therebetween, followed by hot pressing the wound body to form the flattened shape. It is possible for the positive electrode 9, the negative electrode 10 and the separator 11 included in the electrode group 14 to be made integral by using an adhesive polymer. A band-like positive electrode terminal 13 is electrically connected to the positive electrode 9. On the other hand, a band-like negative electrode terminal 12 is electrically connected to the negative electrode 10. The electrode group 14 is housed in the case 7 such that the edge portions of the positive electrode terminal 13 and the negative electrode terminal 12 are allowed to protrude from within the case 7 formed of a laminate film to the outside of the case 7. As shown in the drawing, the positive electrode terminal 13 and the negative electrode terminal 12 are drawn to the outside from the same side of the case 7. Incidentally, the case 7 formed of a laminate film is sealed by means of heat seal.

The materials of the case as well as the positive electrode terminal and the negative electrode terminal included in the flattened nonaqueous electrolyte secondary batteries shown in FIGS. 2 to 4 will now be described.

The case is formed of a laminate film having a thickness not larger than 0.2 mm. Also, a metal container having a wall thickness not larger than 0.5 mm can be used as the case of the nonaqueous electrolyte secondary battery. It is more desirable for the wall thickness of the metal container to be not larger than 0.2 mm.

It is possible for the case to be of a flattened type, a prismatic type, a cylindrical type, a coin type, a button type, a sheet type or a stack type. Of course, the nonaqueous electrolyte secondary battery includes a small secondary battery that is mounted to a portable electronic apparatus and a large battery that is mounted to a vehicle having two to four wheels.

The laminate film includes, for example, a multi-layered film including a metal layer and a resin layer covering the metal layer. For decreasing the weight of the battery, it is desirable for the metal layer to be formed of an aluminum foil or an aluminum alloy foil. On the other hand, the resin layer for reinforcing the metal layer is formed of a polymer material such as polypropylene (PP), polyethylene (PE), Nylon, and polyethylene terephthalate (PET). The laminate film case can be obtained by heat sealing the periphery of superposed laminate films.

It is desirable for the metal case to be formed of aluminum or an aluminum alloy. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium, to be not larger than 1%. In this case, it is possible to improve the battery in respect of reliability for a long time in a high-temperature environment, and heat dissipating properties.

It is desirable for the metal can formed of aluminum or an aluminum alloy to have an average crystal grain size not larger than 50 μm, more preferably not larger than 30 μm, and furthermore preferably not larger than 5 μm. Where the average crystal grain size is not larger than 50 μm, it is possible to increase drastically the mechanical strength of the metal can formed of aluminum or an aluminum alloy to make it possible to decrease the thickness of the metal can. As a result, it is possible to realize a battery that is light in weight, high in output, excellent in reliability over a long period, and adapted for mounting on a vehicle.

The negative electrode terminal is formed of a material exhibiting an electrical stability and conductivity within the range of 0.5V to 3V of the potential relative to the lithium metal potential. To be more specific, the material used for forming the negative electrode terminal includes, for example, aluminum and an aluminum alloy containing at least one element selected from the group consisting of Mg, Ti, Zn, Mn, Fe, Cu and Si. In order to lower the contact resistance relative to the negative electrode current collector, it is desirable for the negative electrode terminal to be formed of a material equal to the material used for forming the negative electrode current collector.

The positive electrode terminal is formed of a material exhibiting an electrical stability and conductivity within the range of 3V to 5V of the potential relative to the lithium metal potential. To be more specific, the material used for forming the positive electrode terminal includes, for example, aluminum and an aluminum alloy containing at least one element selected from the group consisting of Mg, Ti, Zn, Mn, Fe, Cu and Si. In order to lower the contact resistance relative to the positive electrode current collector, it is desirable for the positive electrode terminal to be formed of a material equal to the material used for forming the positive electrode current collector.

Second Embodiment

The battery pack according to a second embodiment comprises at least two unit cells each consisting of the nonaqueous electrolyte secondary battery according to the first embodiment. The unit cells are electrically connected to each other in series or in parallel to form a battery module.

The unit cell according to the first embodiment is adapted for use for obtaining a battery module, and the battery pack according to the second embodiment is excellent in the charge-discharge cycle performance, as described in the following.

If the reactions of the positive and negative electrodes with the ionic liquid are suppressed, it is possible to lower the internal impedance of the unit cell to make it possible to decrease markedly the difference in the capacity among the unit cells. As a result, it is possible to decrease the nonuniformity in the battery voltage among the unit cells derived from the difference in the capacity among the unit cells at the time when, for example, the battery module of a series connection is fully charged. It follows that the battery pack according to the second embodiment can easily control the battery module and, thus, an improvement in the charge-discharge cycle performance of the battery pack can be expected. Also, various protective circuits can be incorporated in the battery pack to further improve the safety in the case where the battery pack is used under an unsteady state or is exposed to an environment beyond the conditions that can be normally expected.

It is possible to use the flattened type nonaqueous electrolyte secondary battery shown in FIG. 2 or FIG. 4 as the unit cell included in the battery module.

Figure 5:
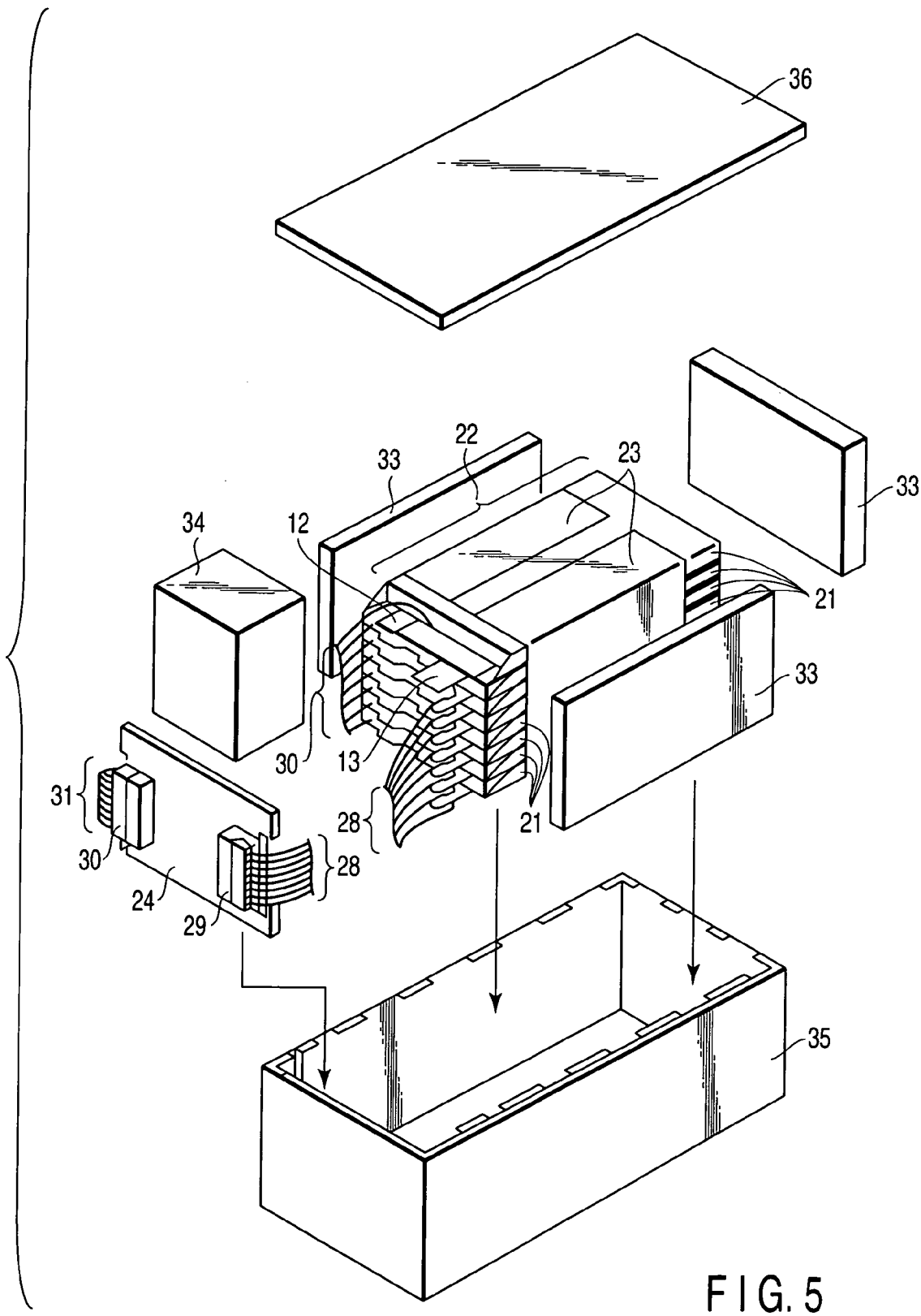
FIG. 5 is an oblique view showing in a dismantled fashion of a battery pack according to a second embodiment.
Figure 6:
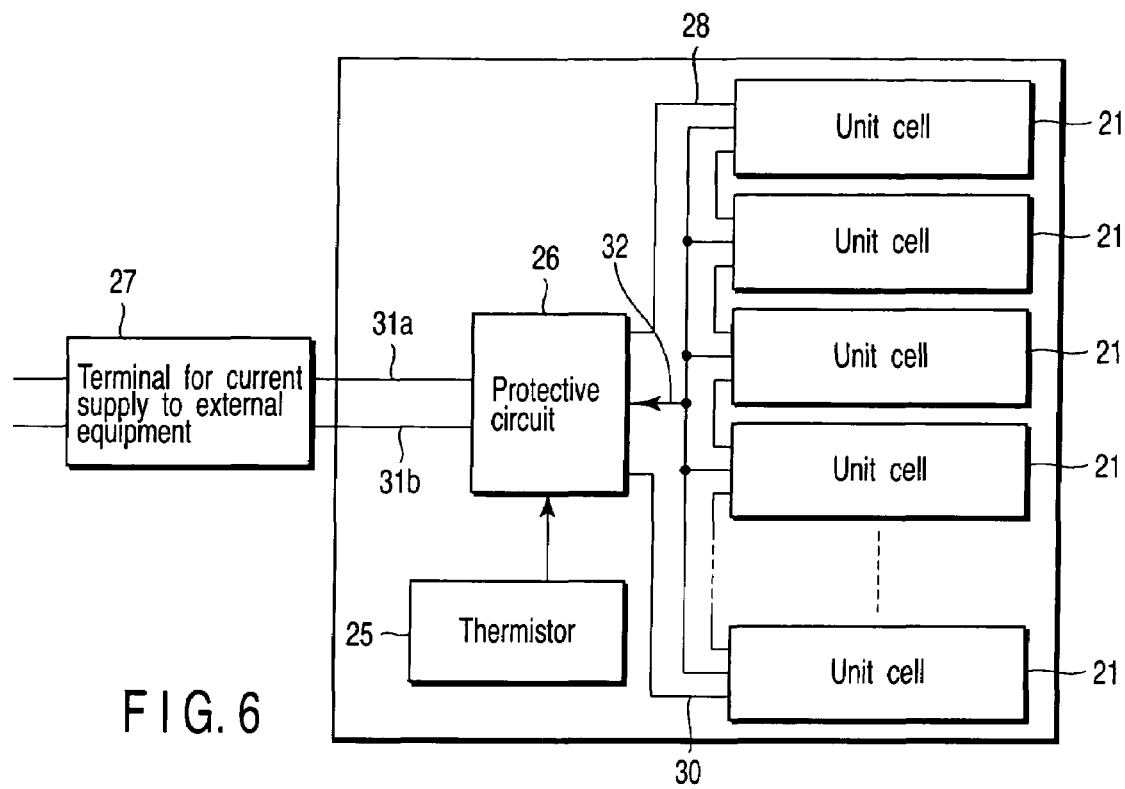
FIG. 6 is a block diagram showing the electric circuit used in the battery pack shown in FIG. 5.

Each of unit cells 21 included in the battery pack shown in FIG. 5 is formed of a flattened type nonaqueous electrolyte battery constructed as shown in FIG. 4. The plural unit cells 21 are stacked one upon the other in the thickness direction in a manner to align the protruding directions of the positive electrode terminals and the negative electrode terminals. As shown in FIG. 6, the unit cells 21 are connected in series to form a battery module 22. The unit cells 21 forming the battery module 22 are made integral by using an adhesive tape 23 as shown in FIG. 5.

A printed wiring board 24 is arranged on the side surface of the battery module 22 toward which protrude the positive electrode terminals 13 and the negative electrode terminals 12. As shown in FIG. 6, a thermistor 25, a protective circuit 26 and a terminal 27 for current supply to the external equipment are connected to the printed wiring board 24.

As shown in FIGS. 5 and 6, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a set temperature, and that the over-charging, over-discharging and over-current of the unit cell 21 have been detected.

In the case of FIG. 6, a wiring 32 is connected to each of the unit cells 21 for detecting the voltage, and the detection signal is transmitted through these wirings 32 to the protective circuit 26.

Protective sheets 33 each formed of rubber or resin may be arranged on the three of the four sides of the battery module 22, though the protective sheet 33 is not arranged on the side toward which protrude the positive electrode terminals 13 and the negative electrode terminals 12. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 5 and 6 are connected in series. However, it is also possible to connect the unit cells 21 in parallel to increase the cell capacity. Of course, it is possible to connect the battery packs in series or in parallel.

Also, the construction of the battery pack can be changed appropriately depending on the use of the battery pack.

It is desirable for the battery pack according to the second embodiment to be used in the field requiring a large capacity that cannot be obtained by the unit cell and in the field requiring a higher safety and stability as in the case where it is possible for the environmental temperature to be elevated. To be more specific, the battery pack can be used as a power source in, for example, a digital camera, a hybrid electric automobile having two to four wheels, and an electric automobile having two to four wheels.

Examples of the present invention will now be described in detail with reference to the accompanying drawings. The secondary battery for each of Examples 1 to 5 and Comparative Examples 1 to 6 given below is constructed as shown in FIG. 1.

EXAMPLE 1

A slurry was prepared by dispersing 90% by weight of lithium-cobalt oxide ($LiCoO_2$) used as a positive electrode active material, 2% by weight of acetylene black, 3% by weight of graphite, and 5% by weight of polyvinylidene fluoride used as a binder in N-methyl pyrrolidone used as a solvent. An aluminum foil having a thickness of 20 μm was coated with the slurry thus obtained, followed by drying and, then, rolling the aluminum foil coated with the slurry to obtain a positive electrode sheet. The positive electrode sheet thus prepared was cut into a circular piece having a diameter of 15 mm to obtain a positive electrode. The weight of the positive electrode thus obtained was found to be 17.8 mg. The charge and discharge potential of the positive electrode thus obtained was about 3.0 to 4.3V relative to the lithium metal potential (lithium electrode potential).

Similarly, another slurry was prepared by dispersing 90% by weight of a powdery $Li_4Ti_5O_{12}$ used as a negative electrode active material, 5% by weight of a synthetic graphite used as a conductive material, and 5% by weight of polyvinylidene fluoride (PVdF) used as a binder in N-methylpyrrolidone (NMP) used as a solvent. An aluminum foil having a thickness of 20 μm was coated with the slurry thus obtained, followed by drying and, then, rolling the aluminum foil coated with the slurry to obtain a negative electrode sheet. The negative electrode sheet thus prepared was cut into a circular piece having a diameter of 16 mm to obtain a negative electrode. The weight of the negative electrode thus obtained was found to be 15.5 mg. The working potential of the negative electrode was measured by the method described in the following and was found to be nobler than the lithium metal potential (lithium electrode potential) by about 1.0 to 1.6V.

The negative electrode was cut into a small piece sized at 1 cm×1 cm to obtain a working electrode. The working electrode was disposed to face a counter electrode formed of a lithium metal foil sized at 2 cm×2 cm with a glass filter (separator) interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 50 mL of an electrolysis solution, which was prepared by dissolving $LiBF_4$ in a concentration of 2 mol/L in a mixed solvent prepared by mixing EC and GBL in a mixing ratio by volume of 25:75, was poured into the glass cell such that the separator and the electrodes were sufficiently impregnated with the electrolysis solution, followed by hermetically closing the glass cell. The glass cell thus manufactured was arranged in a constant temperature bath maintained at 25° C. to measure the lithium ion insertion potential of the working electrode at the time when the glass cell was charged with a current density of 0.1 mA/cm$^2$.

On the other hand, an unwoven fabric of polyethylene terephthalate was used as a separator.

Further, an electrolyte was prepared by dissolving 2.0 mol/L of lithium tetrafluoroborate ($LiBF_4$) in 1-ethyl-3-methyl imidazolium tetrafluoroborate (EMI. $BF_4$). Still further, a nonaqueous electrolyte was prepared by adding diethyl allyl phosphate represented by chemical formula (1) given previously, in which n=1 and R=H, to the resultant electrolyte in an amount of 2% by weight. Diethyl allyl phosphate used in the other Examples described herein later was equal to that noted above unless otherwise specified.

The positive electrode was housed in a coin-shaped positive electrode container, and the negative electrode was arranged on the positive electrode with the separator interposed therebetween, followed by putting the nonaqueous electrolyte into the positive electrode container and subsequently carrying out a vacuum impregnation. Further, a coin-shaped negative electrode container was crimped to the positive electrode container with an insulating gasket interposed therebetween to manufacture a coin-shaped nonaqueous electrolyte secondary battery. The standard capacity of the secondary battery calculated from the amount of the active materials contained in the electrodes was found to be 1.25 mAh.

EXAMPLE 2

A nonaqueous electrolyte secondary battery was manufactured as in Example 1, except that a nonaqueous electrolyte was prepared by adding 3% by weight of diethyl allyl phosphate to an electrolyte prepared by dissolving 2.0 mol/L of lithium tetrafluoroborate ($LiBF_4$) in 1-ethyl-3-methyl imidazolium tetrafluoroborate (EMI.$BF_4$).

EXAMPLE 3

A nonaqueous electrolyte secondary battery was manufactured as in Example 1, except that a nonaqueous electrolyte was prepared by adding 1% by weight of diethyl allyl phosphate to an electrolyte prepared by dissolving 2.0 mol/L of lithium tetrafluoroborate ($LiBF_4$) in 1-ethyl-3-methyl imidazolium tetrafluoroborate (EMI.$BF_4$)

EXAMPLE 4

A slurry was prepared by dispersing 90% by weight of a powdery FeS used as a negative electrode active material, 2.5% by weight of a synthetic graphite, 2.5% by weight of acetylene black, and 5% by weight of polyvinylidene fluoride (PVdF) in N-methylpyrrolidone (NMP). Then, an aluminum foil having a thickness of 20 μm was coated with the slurry thus prepared, followed by drying and, then, rolling the aluminum foil coated with the slurry to obtain a negative electrode sheet. The negative electrode sheet thus obtained was cut into a circular piece having a diameter of 16 mm to obtain a negative electrode. The weight of the negative electrode thus obtained was found to be 10.1 mg. The working potential of the negative electrode was found to be nobler by about 1.2 to 1.9V than the lithium metal potential. Finally, a nonaqueous electrolyte secondary battery was manufactured as in Example 1, except that the negative electrode referred to above was used for manufacturing the nonaqueous electrolyte secondary battery.

EXAMPLE 5

A nonaqueous electrolyte secondary battery was manufactured as in Example 1, except that a nonaqueous electrolyte was prepared by adding 1% by weight of diethyl allyl phosphate to an electrolyte prepared by dissolving 0.5 mol/L of lithium bis (trifluoromethane sulfonyl) amide (LiTFSI) in N-methyl-N-propyl piperidinium bis (trifluoromethane sulfonyl) amide.

EXAMPLE 6

A nonaqueous electrolyte secondary battery was manufactured as in Example 1, except that a nonaqueous electrolyte was prepared by adding 0.1% by weight of diethyl allyl phosphate to an electrolyte prepared by dissolving 2.0 mol/L of lithium tetrafluoroborate ($LiBF_4$) in 1-ethyl-3-methyl imidazolium tetrafluoroborate (EMI.$BF_4$)

COMPARATIVE EXAMPLE 1

A nonaqueous electrolyte secondary battery was manufactured as in Example 1, except that a nonaqueous electrolyte was prepared by dissolving 2.0 mol/L of lithium tetrafluoroborate ($LiBF_4$) in 1-ethyl-3-methyl imidazolium tetrafluoroborate (EMI.$BF_4$)

COMPARATIVE EXAMPLE 2

A nonaqueous electrolyte secondary battery was manufactured as in Example 1, except that a nonaqueous electrolyte was prepared by adding 5% by weight of TMP (trimethyl phosphate) to an electrolyte prepared by dissolving 2.0 mol/L of lithium tetrafluoroborate ($LiBF_4$) in 1-ethyl-3-methyl imidazolium tetrafluoroborate (EMI.$BF_4$).

COMPARATIVE EXAMPLE 3

A nonaqueous electrolyte secondary battery was manufactured as in Example 1, except that a nonaqueous electrolyte was prepared by adding 3% by weight of dimethyl allyl phosphate represented by chemical formula given previously, where Et (ethyl) was replaced by Me (methyl) and n=1 and R=H, to an electrolyte prepared by dissolving 2.0 mol/L of lithium tetrafluoroborate ($LiBF_4$) in 1-ethyl-3-methyl imidazolium tetrafluoroborate ($EMI.BF_4$)

COMPARATIVE EXAMPLE 4

A slurry was prepared by dispersing in water 87% by weight of a mesophase pitch series graphite fiber baked at 3,000° C., 10% by weight of a synthetic graphite having an average particle diameter of 5 μm, 1% by weight of carboxymethyl cellulose, and 2% by weight of styrene.butadiene rubber. Then, a copper foil was coated with the slurry thus prepared, followed by drying and, then, rolling the copper foil coated with the slurry to obtain a negative electrode sheet. The negative electrode sheet thus obtained was cut into a circular piece having a diameter of 16 mm to obtain a negative electrode. The weight of the negative electrode thus obtained was found to be 11.4 mg. The working potential of the negative electrode was found to be nobler by about 0 to 0.4V than the lithium metal potential. Finally, a nonaqueous electrolyte secondary battery was manufactured as in Example 1, except that the negative electrode referred to above was used for manufacturing the nonaqueous electrolyte secondary battery.

COMPARATIVE EXAMPLE 5

A nonaqueous electrolyte secondary battery was manufactured as in Example 4, except that a nonaqueous electrolyte was prepared by dissolving 2.0 mol/L of lithium tetrafluoroborate ($LiBF_4$) in 1-ethyl-3-methyl imidazolium tetrafluoroborate ($EMI.BF_4$)

COMPARATIVE EXAMPLE 6

A nonaqueous electrolyte secondary battery was manufactured as in Example 1, except that a nonaqueous electrolyte was prepared by dissolving 0.5 mol/L of lithium bis (trifluoromethane sulfonyl) amide (LiTFSI) in N-methyl-N-propyl-piperidinium bis (trifluoromethane sulfonyl) amide.

Figure 7:
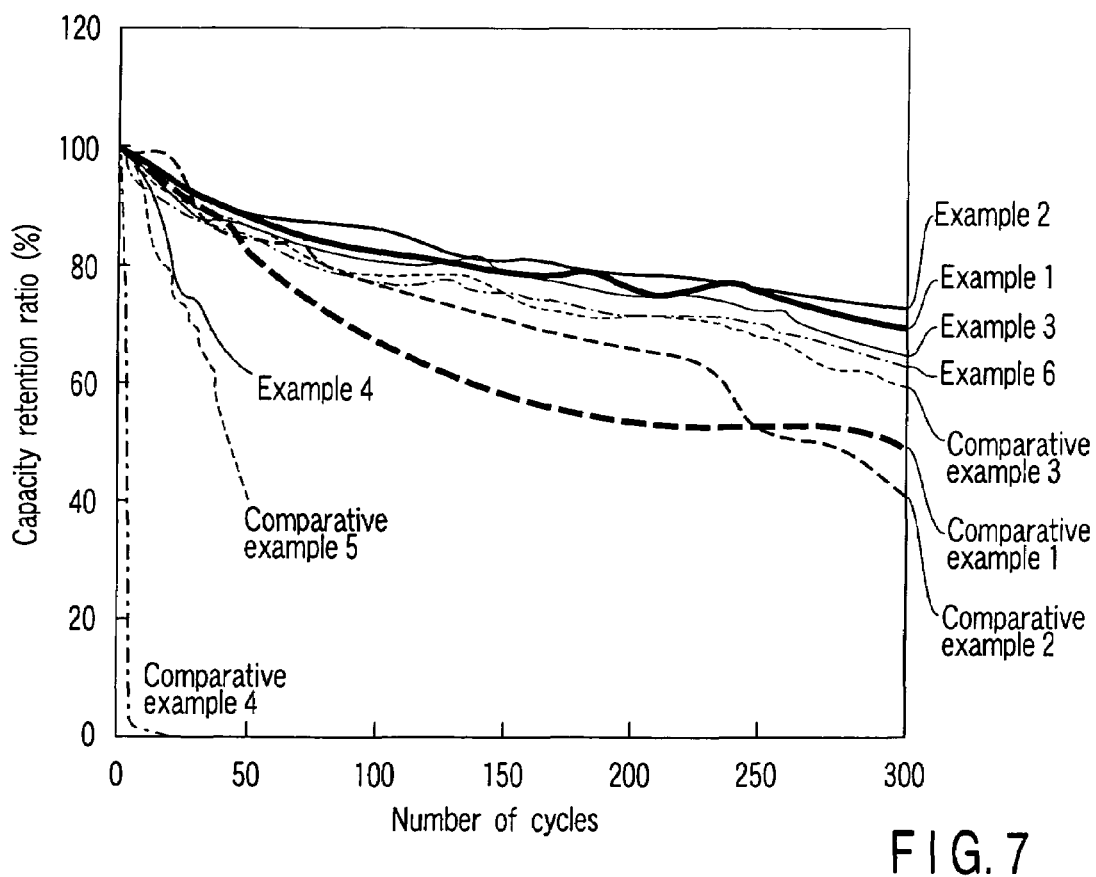
FIG. 7 is a graph showing the charge-discharge cycle performance of the nonaqueous electrolyte secondary batteries for Examples 1 to 4, 6 and Comparative Examples 1 to 5.
Figure 8:
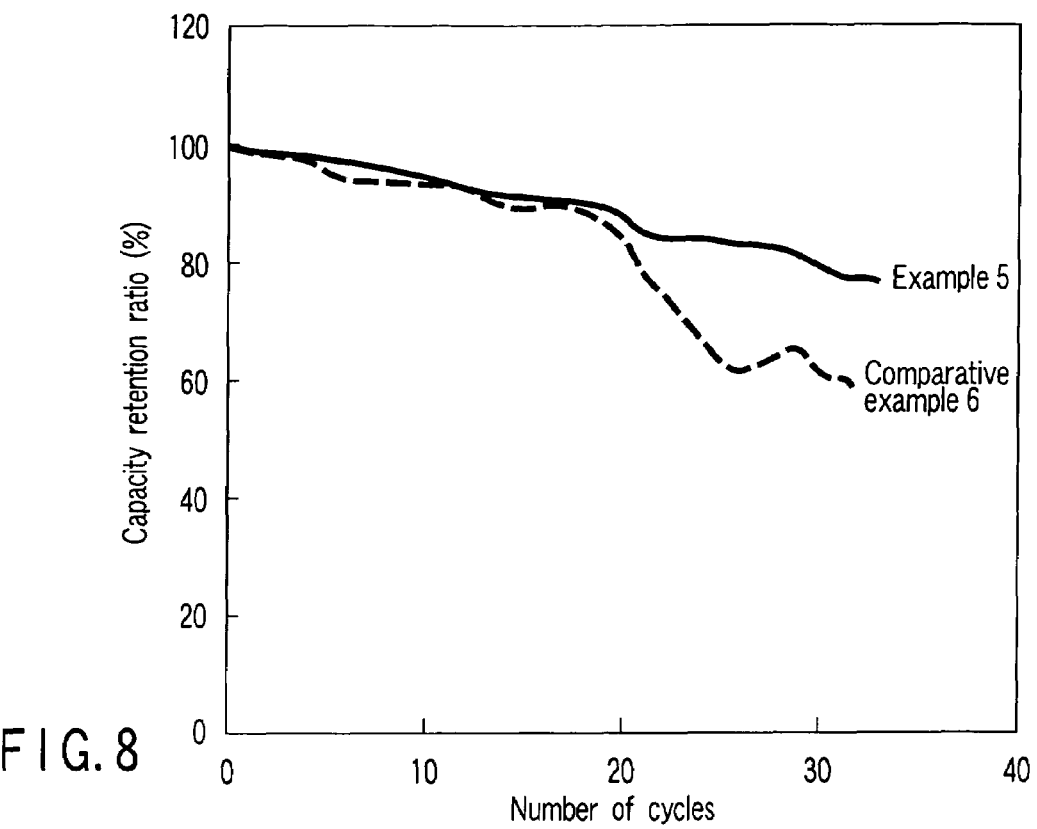
FIG. 8 is a graph showing the charge-discharge cycle performance of the nonaqueous electrolyte secondary batteries for Example 5 and Comparative Example 6.

The nonaqueous electrolyte secondary battery manufactured in each of Examples 1 to 6 and Comparative Examples 1 to 6 was charged to 2.8V under a constant current of 0.2 mA. Then, after the battery voltage of 2.8V was reached, the secondary battery was charged under a constant voltage by maintaining the battery voltage of 2.8V. The charging time under a constant current and the charging time under a constant voltage was 10 hours in total. Further, the secondary battery was discharged to 1.5V under a constant current of 0.2 mA, followed by evaluating the charge-discharge cycle performance of the secondary battery under the conditions given below. Specifically, in the first step, the secondary battery was charged to 2.7V under a constant current of 1.0 mA. After the battery voltage of 2.7 V was reached, the secondary battery was charged under a constant voltage of 2.7V such that (1) the constant current charging and the constant voltage charging were performed for 10 hours in total. Alternatively, (2) the secondary battery was charged under a constant voltage until the charging current was decreased to 0.03 mA. After charge operation, the secondary battery was discharged to 1.5V under a constant current of 1.0 mA. The electric circuit of the secondary battery was left open for 15 minutes between the charging operation and the discharging operation. The change in the discharge capacity obtained by the charge-discharge cycle operations described above is shown in FIGS. 7 and 8. FIG. 7 covers the experimental data for Examples 1 to 4 and 6 and Comparative Examples 1 to 5. Also, FIG. 8 covers the experimental data for Example 5 and Comparative Example 6. Each of FIGS. 7 and 8 shows the capacity retention ratio that was determined on the basis that the discharge capacity of each secondary battery at the start-up time of the charge-discharge cycle evaluation was set at 100%.

As apparent from FIG. 7, the secondary battery for each of Examples 1 to 3 and 6, in which the nonaqueous electrolyte was allowed to contain diethyl allyl phosphate, exhibited a discharge capacity retention ratio higher than that of the secondary battery for Comparative Example 1, in which both of diethyl allyl phosphate and other organic solvent were not added to the nonaqueous electrolyte. Also, the secondary battery for each of Examples 1 to 3 and 6 exhibited a discharge capacity retention ratio higher than that of the secondary battery for Comparative Example 2, in which the nonaqueous electrolyte was allowed to contain TMP, and higher than that of the secondary battery for Comparative Example 3, in which the nonaqueous electrolyte was allowed to contain dimethyl allyl phosphate. Further, in the secondary battery for Comparative Example 4, in which a graphite powder was used as the negative electrode active material, the discharge capacity was rapidly deteriorated in the initial period, with the result that the cycle performance of the secondary battery were found to be markedly lower than those of the secondary battery for each of Examples 1 to 3.

Still further, the experimental data for Example 4 and Comparative Example 5 support that the use of diethyl allyl phosphate is effective for improving the discharge capacity retention ratio in the charge-discharge cycle test even in the case of using FeS as the negative electrode active material.

On the other hand, the electrolyte used in the secondary battery for each of Example 5 and Comparative Example 6 was prepared by dissolving 0.5 mol/L of lithium bis (trifluoromethane sulfonyl) amide (LiTFSI) in N-methyl-N-propyl piperidinium bis (trifluoromethane sulfonyl) amide. FIG. 8 shows that, even in the case of using the particular electrolyte noted above, the discharge retention ratio of the secondary battery for Example 5, in which the nonaqueous electrolyte contained diethyl allyl phosphate, was higher than that of the secondary battery for Comparative Example 6, in which diethyl allyl phosphate was not added to the nonaqueous electrolyte.

It should also be noted that the secondary batteries for Examples 5 and 3 were equal to each other in the addition amount of diethyl allyl phosphate. In this case, it is interesting to compare these secondary batteries in respect of the number of charge-discharge cycles required for the discharge capacity retention ratio to be lowered to 80%. As apparent from the experimental data, the number of charge-discharge cycles for the secondary battery for Example 3 was larger than that for Example 5. This clearly supports that, in order to further improve the charge-discharge cycle performance of the secondary battery, it is desirable to use the ionic liquid containing a fluorine-containing anion and a cation having an imidazolium skeleton.

EXAMPLE 7

A slurry was prepared by dispersing 90% by weight of a powdery lithium-cobalt oxide ($LiCoO_2$), 2% by weight of acetylene black, 3% by weight of graphite, and 5% by weight of polyvinylidene fluoride used as a binder in N-methylpyrrolidone used as a solvent. Then, both surfaces of an aluminum foil having a thickness of 20 μm were coated with the slurry thus prepared, followed by drying and, then, rolling the aluminum foil coated with the slurry to obtain a positive electrode sheet. The coating amount was 90 g/m² after the drying for each surface of the aluminum foil. The positive electrode sheet was cut into an oblong piece having a length of 170 mm and a width of 50 mm. The coated slurry over the length of 20 mm of the cut piece of the positive electrode sheet was peeled off to expose selectively the aluminum foil to the outside, and an aluminum ribbon 80 mm long, 4 mm wide and 0.1 mm thick was mounted to the exposed surface of the aluminum foil by means of an ultrasonic welding to obtain a positive electrode. The charge-discharge potential of the positive electrode thus obtained was about 3.0 to 4.3V relative to the lithium metal potential.

Also, another slurry was prepared by suspending 90% by weight of a $Li_4Ti_5O_{12}$ powder used as a negative electrode active material, 5% by weight of a synthetic graphite used as a conductive material, and 5% by weight of polyvinylidene fluoride (PVdF) used as a binder in N-methylpyrrolidone (NMP) used as a solvent. Then, both surfaces of an aluminum foil having a thickness of 20 μm were coated with the slurry thus prepared, followed by drying and, then, rolling the aluminum foil coated with the slurry to obtain a negative electrode sheet. The coating amount was 75 g/m² after the drying for each surface of the aluminum foil. The negative electrode sheet was cut into an oblong piece having a length of 170 mm and a width of 50 mm. The coated slurry over the length of 20 mm of the cut piece of the negative electrode sheet was peeled off to expose selectively the aluminum foil to the outside, and an aluminum ribbon 80 mm long, 4 mm wide and 0.1 mm thick was mounted to the exposed surface of the aluminum foil by means of an ultrasonic welding to obtain a negative electrode. The working potential of the negative electrode thus obtained was nobler by about 1.2 to 1.6V than the lithium metal potential.

An unwoven fabric of polyethylene terephthalate was used as the separator.

Further, a nonaqueous electrolyte was prepared by adding 2% by weight of diethyl allyl phosphate represented by chemical formula given previously, where n=1 and R=H, to an electrolyte prepared by dissolving 2.0 mol/L of lithium tetrafluoroborate ($LiBF_4$) in 1-ethyl-3-methyl imidazolium tetrafluoroborate ($EMI.BF_4$).

The separator, the positive electrode, the additional separator and the negative electrode noted above were stacked one upon the other in the order mentioned and each of these separators and each of these electrodes were folded along the shorter side every 35 mm of the longer side to prepare a wound body sized at 35 mm×50 mm. The wound body was housed in a container made of a laminate film containing aluminum, and the nonaqueous electrolyte was also poured into the container to carry out a vacuum impregnation. Then, the container was heat sealed, thereby obtaining a nonaqueous electrolyte secondary battery constructed as shown in FIG. 4. The standard capacity of the nonaqueous electrolyte secondary battery was found to be 150 mAh.

EXAMPLE 8

A nonaqueous electrolyte secondary battery was manufactured as in Example 7, except that lithium-nickel-cobalt-manganese oxide ($LiNi_{1/3}Co_{1/3}Mn_{1/3}O_2$) powder was used as the positive electrode active material. The charge-discharge potential of the resultant positive electrode was found to be about 3.0 to 4.3V relative to the lithium metal potential.

COMPARATIVE EXAMPLE 7

A nonaqueous electrolyte secondary battery was manufactured as in Example 7, except that the nonaqueous electrolyte was prepared by adding 5% by weight of trimethyl phosphate (TMP) to an electrolyte prepared by dissolving 2.0 mol/L of lithium tetrafluoroborate ($LiBF_4$) in 1-ethyl-3-methyl imidazolium tetrafluoroborate ($EMI.BF_4$).

Figure 9:
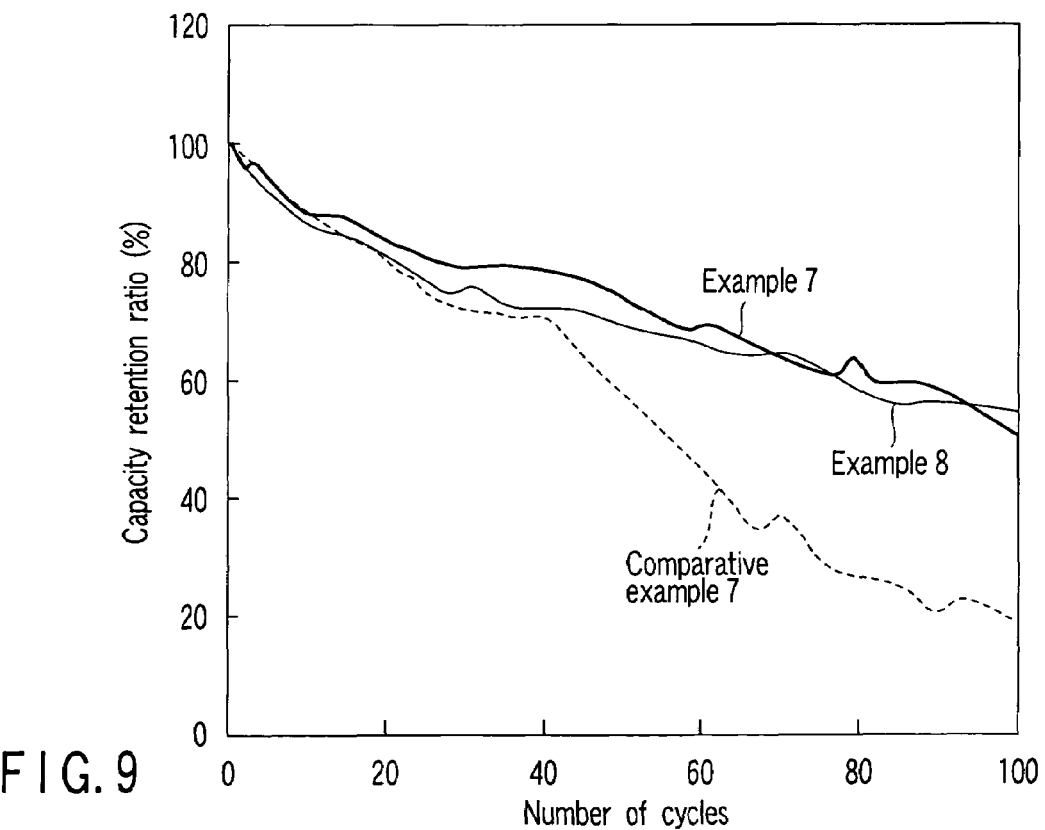
FIG. 9 is a graph showing the charge-discharge cycle performance of the nonaqueous electrolyte secondary batteries for Examples 7, 8 and Comparative Example 7.

The nonaqueous electrolyte secondary battery manufactured in each of Examples 7 and 8 and Comparative Examples 7 was charged to 2.8V under a constant current of 15 mA. Then, after the battery voltage of 2.8V was reached, the secondary battery was charged under a constant voltage of 2.8V. The total time of the charging under a constant current and the charging under a constant voltage was 10 hours. Then, the secondary battery was discharged to 1.5V under a constant current of 15 mA. Further, the charge-discharge cycle performance of the secondary battery were evaluated under the conditions given below. Specifically, in the first step, the secondary battery was charged to 2.7V under a constant current of 15 mA. After the battery voltage of 2.7V was reached, the secondary battery was charged under a constant voltage of 2.7V such that (1) the constant current charging and the constant voltage charging were performed for 10 hours in total. Alternatively, (2) the secondary battery was charged under a constant voltage until the charging current was decreased to 0.5 mA. The secondary battery was discharged to 1.5V under a constant current of 15 mA. The electric circuit of the secondary battery was left open for 30 minutes between the charging operation and the discharging operation. The charge-discharge operations and the opening of the electric circuit were performed within a constant temperature bath maintained at 50° C. The change in the discharge capacity obtained by the charge-discharge cycle operations described above is shown in FIG. 9. FIG. 9 shows the capacity retention ratio that was determined on the basis that the discharge capacity of each secondary battery at the start-up time of the charge-discharge cycle evaluation was set at 100%. Also, no change in the outer appearance was recognized in the secondary battery for each of Examples 7 and 8 at the finishing time of the 100th charge-discharge cycle. However, swelling of the case was recognized in the secondary battery for Comparative Example 7.

The graph of FIG. 9 supports that the secondary battery for each of Examples 7 and 8, in which diethyl allyl phosphate was contained in the nonaqueous electrolyte, was capable of exhibiting a discharge capacity retention ratio higher than that of the secondary battery for Comparative Example 7, in which diethyl allyl phosphate was not contained in the nonaqueous electrolyte.

As described above, the embodiments make it possible to improve the charge-discharge cycle performance of the nonaqueous electrolyte secondary battery comprising a nonaqueous electrolyte exhibiting a high flame retardancy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:
a negative electrode comprising an active material providing a working potential which is nobler than a lithium metal potential by at least 0.5V;
a positive electrode; and
a nonaqueous electrolyte consisting of a lithium salt, an ionic liquid and an allyl phosphate represented by chemical formula given below,
wherein the allyl phosphate is contained in the nonaqueous electrolyte in an amount of from 0.5% to 2% by weight:

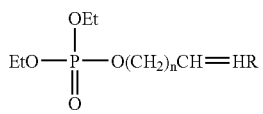

wherein R denotes a hydrogen atom or an alkyl group having 1 to 3 carbon atoms, and n denotes an integer of 1 to 3.

2. The secondary battery according to claim 1, wherein R denotes a hydrogen atom and the integer n is 1.

3. The secondary battery according to claim 1, wherein the ionic liquid comprises a cation having an imidazolium structure.

4. The secondary battery according to claim 1, wherein the ionic liquid comprises a cation having an imidazolium structure and an anion comprising fluorine atom.

5. The secondary battery according to claim 1, wherein the positive electrode comprises a lithium-metal composite oxide in which the metal comprises at least one selected from the group consisting of cobalt, manganese and nickel.

6. The secondary battery according to claim 1, wherein the positive electrode comprises a positive electrode active material represented by $LiCo_xNi_yMn_zO_2$ wherein $x+y+z=1$, $0<x\leq0.5$, $0\leq y<1$, and $0\leq z<1$.

7. The secondary battery according to claim 1, wherein a difference between the lithium metal potential and the negative active material working potential falls within a range of 0.5 to 3V.

8. The secondary battery according to claim 1, wherein the active material of the negative electrode comprises lithium-titanium oxides or iron sulfides.

9. The secondary battery according to claim 1, wherein the active material of the negative electrode comprises a lithium-titanium oxide having a spinel structure.

10. A battery pack comprising a nonaqueous electrolyte secondary battery, wherein the nonaqueous electrolyte secondary battery comprises:
a negative electrode comprising an active material providing a working potential which is nobler than a lithium metal potential by at least 0.5V;
a positive electrode; and
a nonaqueous electrolyte consisting of a lithium salt, an ionic liquid and an allyl phosphate represented by chemical formula given below, wherein the allyl phosphate is contained in the nonaqueous electrolyte in an amount of from 0.5% to 2% by weight:

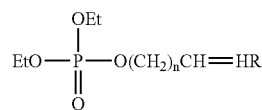

wherein R denotes a hydrogen atom or an alkyl group having 1 to 3 carbon atoms, and n denotes an integer of 1 to 3.

11. The battery pack according to claim 10, wherein R denotes hydrogen atom and the integer n is 1.

12. The battery pack according to claim 10, wherein the ionic liquid comprises a cation having an imidazolium structure.

13. The battery pack according to claim 10, wherein the ionic liquid comprises a cation having an imidazolium structure and an anion comprising a fluorine atom.

14. The battery pack according to claim 10, wherein the positive electrode comprises a lithium-metal composite oxide in which the metal comprises at least one of cobalt, manganese and nickel.

15. The battery pack according to claim 10, wherein the positive electrode comprises a positive electrode active material represented by $LiCo_xNi_yMn_zO_2$ wherein $x+y+z=1$, $0<x\leq0.5$, $0\leq y<1$, and $0\leq z<1$).

16. The battery pack according to claim 10, wherein the active material of the negative electrode comprises lithium-titanium oxides or iron sulfides.

17. The battery pack according to claim 10, wherein the active material of the negative electrode comprises a lithium-titanium oxide having a spinel structure.

* * * * *